(12) United States Patent
Anderson et al.

(10) Patent No.: US 11,702,202 B1
(45) Date of Patent: Jul. 18, 2023

(54) SYSTEMS, METHODS AND APPARATUS FOR MULTI-ARM EXPANSION

(71) Applicant: Government of the United States, as represented by the Secretary of the Air Force, Wright-Patterson AFB, OH (US)

(72) Inventors: Michael L. Anderson, Colorado Springs, CO (US); Zachary Froembling, Yelm, WA (US); Kaz I. Teope, Corvallis, OR (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 1,081 days.

(21) Appl. No.: 16/402,562

(22) Filed: May 3, 2019

(51) Int. Cl.
| | |
|---|---|
| *B64C 39/02* | (2023.01) |
| *B64C 27/33* | (2006.01) |
| *F16M 13/02* | (2006.01) |
| *B64C 1/30* | (2006.01) |
| *F16H 25/22* | (2006.01) |
| *F15B 15/14* | (2006.01) |
| *B64U 10/13* | (2023.01) |
| *B64U 30/20* | (2023.01) |

(52) U.S. Cl.
CPC .............. *B64C 39/024* (2013.01); *B64C 1/30* (2013.01); *B64C 27/33* (2013.01); *F16M 13/022* (2013.01); *B64U 10/13* (2023.01); *B64U 30/20* (2023.01); *F15B 15/14* (2013.01); *F16H 25/2204* (2013.01); *F16M 2200/06* (2013.01); *F16M 2200/021* (2013.01)

(58) Field of Classification Search
CPC combination set(s) only.
See application file for complete search history.

(56) References Cited

U.S. PATENT DOCUMENTS

| | | | |
|---|---|---|---|
| 8,292,215 B2 | 10/2012 | Olm et al. | |
| 8,931,730 B2* | 1/2015 | Wang et al. | ........... B64C 27/08 244/17.23 |
| 9,242,714 B2 | 1/2016 | Wang et al. | |
| 9,446,845 B2 | 9/2016 | Mintchev et al. | |
| 9,676,477 B1 | 6/2017 | Kimchi et al. | |
| 9,783,294 B2 | 10/2017 | Johannesson et al. | |
| 9,878,786 B2 | 1/2018 | Chan et al. | |
| 9,902,491 B2 | 2/2018 | Chan et al. | |
| 9,908,632 B1 | 3/2018 | Kimchi et al. | |
| 9,914,537 B2 | 3/2018 | Wu et al. | |
| 10,035,581 B2 | 7/2018 | Wood | |
| 10,065,726 B1 | 9/2018 | Phan et al. | |

(Continued)

FOREIGN PATENT DOCUMENTS

WO 2017143501 A1 8/2017

*Primary Examiner* — Monica E Millner
(74) *Attorney, Agent, or Firm* — Afmclo/Jaz; Jeffrey R. Moore

(57) ABSTRACT

A system, method and apparatus for unfolding and folding a multi-arm device that includes a support member and an actuator. A first arm is coupled to the actuator and extends from a folded position to an unfolded position upon actuation of the actuator. A second arm is coupled to the actuator and moves from a folded position to an unfolded position upon actuation of a linkage that causes the second arm to rotate. A third arm moves from a folded position to an unfolded position, via an elbow joint, upon release of a tether attached to the third arm.

5 Claims, 5 Drawing Sheets

(56) References Cited

U.S. PATENT DOCUMENTS

| | | | |
|---|---|---|---|
| 10,793,270 B2* | 10/2020 | Chen et al. | B64C 3/56 |
| 2010/0044499 A1 | 2/2010 | Dragan et al. | |
| 2013/0105635 A1 | 5/2013 | Alzu'bi et al. | |
| 2014/0263823 A1 | 9/2014 | Wang et al. | |
| 2015/0321755 A1 | 11/2015 | Martin et al. | |
| 2016/0129998 A1 | 5/2016 | Welsh et al. | |
| 2016/0272310 A1 | 9/2016 | Chan et al. | |
| 2016/0304199 A1 | 10/2016 | Chan et al. | |
| 2016/0340028 A1 | 11/2016 | Datta | |
| 2016/0376004 A1 | 12/2016 | Claridge et al. | |
| 2017/0029101 A1 | 2/2017 | Weissenberg | |
| 2017/0043870 A1* | 2/2017 | Wu et al. | B64D 47/08 |
| 2017/0166308 A1 | 6/2017 | Desrochers et al. | |
| 2017/0174336 A1 | 6/2017 | Baba et al. | |
| 2017/0183081 A1 | 6/2017 | Du et al. | |
| 2017/0197703 A1 | 7/2017 | Wood | |
| 2017/0217571 A1 | 8/2017 | Deng et al. | |
| 2017/0225781 A1 | 8/2017 | Almasoud | |
| 2017/0247098 A1 | 8/2017 | Sanlaville et al. | |
| 2017/0247106 A1 | 8/2017 | Sanlaville et al. | |
| 2017/0259914 A1 | 9/2017 | Bevirt et al. | |
| 2017/0313400 A1 | 11/2017 | Zhydanov | |
| 2017/0313418 A1 | 11/2017 | Yoon | |
| 2017/0369164 A1 | 12/2017 | Klein | |
| 2018/0044003 A1* | 2/2018 | Hsieh et al. | B64C 27/08 |
| 2018/0093753 A1 | 4/2018 | Chow | |
| 2018/0105254 A1* | 4/2018 | Tian et al. | B64C 39/024 |
| 2018/0134369 A1 | 5/2018 | Tian et al. | |
| 2018/0148168 A1 | 5/2018 | Newman | |
| 2018/0155018 A1 | 6/2018 | Kovac et al. | |
| 2018/0170510 A1 | 6/2018 | Brock | |
| 2018/0170539 A1 | 6/2018 | Claridge et al. | |
| 2018/0170541 A1 | 6/2018 | Wu et al. | |
| 2018/0178896 A1 | 6/2018 | Lee | |
| 2018/0208291 A1 | 7/2018 | Tian et al. | |
| 2018/0229837 A1 | 8/2018 | Kimchi et al. | |
| 2018/0281933 A1 | 10/2018 | Davis et al. | |
| 2018/0354612 A1* | 12/2018 | Hefner et al. | B64C 11/48 |
| 2019/0071178 A1* | 3/2019 | Caubel | A63H 27/12 |

* cited by examiner

SYSTEMS, METHODS AND APPARATUS FOR MULTI-ARM EXPANSION

STATEMENT OF GOVERNMENT INTEREST

The embodiments described herein may be manufactured and used by or for the Government of the United States for all governmental purposes without the payment of any royalty.

FIELD OF THE DISCLOSURE

The present disclosure relates to automatic folding and unfolding of structural members, such as rotor arms of unmanned vehicles. This permits for enhanced stowage and deployment of vehicles and structural members having multiple expandable arms.

BACKGROUND OF THE DISCLOSURE

The disclosure is directed to expanding (unfolding) and contracting (folding) arms and/or structural members of objects. One technology area of particular interest is unmanned aerial vehicles ("UAV") and particularly UAVs that have multiple arms, each arm supporting an associated rotor.

Typically, multiple rotor ("MR") UAVs have been unable to operate over long distances. This has limited their use in military applications. Conventional MR UAVs have been hand-delivered to within range of the intended target, at great risk to military personnel. In commercial applications, operators are currently required to bring the MR UAVs close to the location of use. Prior devices have been conceived to fold MRs into more compact configurations for easier storage/transport, but these designs are of limited use because the devices do not unfold automatically; instead, they must be "assembled" by an operator before use. Therefore, these prior techniques do not extend the autonomous range of MR UAVs.

BRIEF SUMMARY OF THE DISCLOSURE

It will be understood that the disclosure is not limited to the embodiments described herein. To the contrary, it includes all alternatives, modifications, and equivalents as may be included within the spirit and scope.

Embodiments of the present disclosure are directed to systems, methods and apparatus for multi-arm expansion. Indeed, the disclosure describes embodiments directed to expanding (unfolding) and contracting (folding) arms and/or structural members of objects. One technology area of particular interest is unmanned aerial vehicles that have multiple arms, each arm supporting an associated rotor.

One embodiment is directed to unfolding a multi-arm device comprising a support member and an actuator, which is mounted on a portion of the support member. A first arm is coupled to the support member at a first portion of the first arm. The first arm operatively coupled to the actuator and adapted to extend from a first position to a second position upon actuation of the actuator. A second arm is coupled to the support member at a first portion of the second arm. The second arm is operatively coupled to the actuator and adapted to move from a first position to a second position upon actuation of a linkage. A third arm is coupled to the support member at a first portion of the third arm. The third arm is adapted to move from a first position to a second position upon release of a linkage, which may be a tether, attached to the third arm.

BRIEF DESCRIPTION OF THE DRAWINGS

The accompanying drawings, which are incorporated in and constitute a part of this specification, illustrate embodiments of the present disclosure and, together with a general description given above, and the detailed description given below, explain the principles of the present disclosure.

Figure 1:
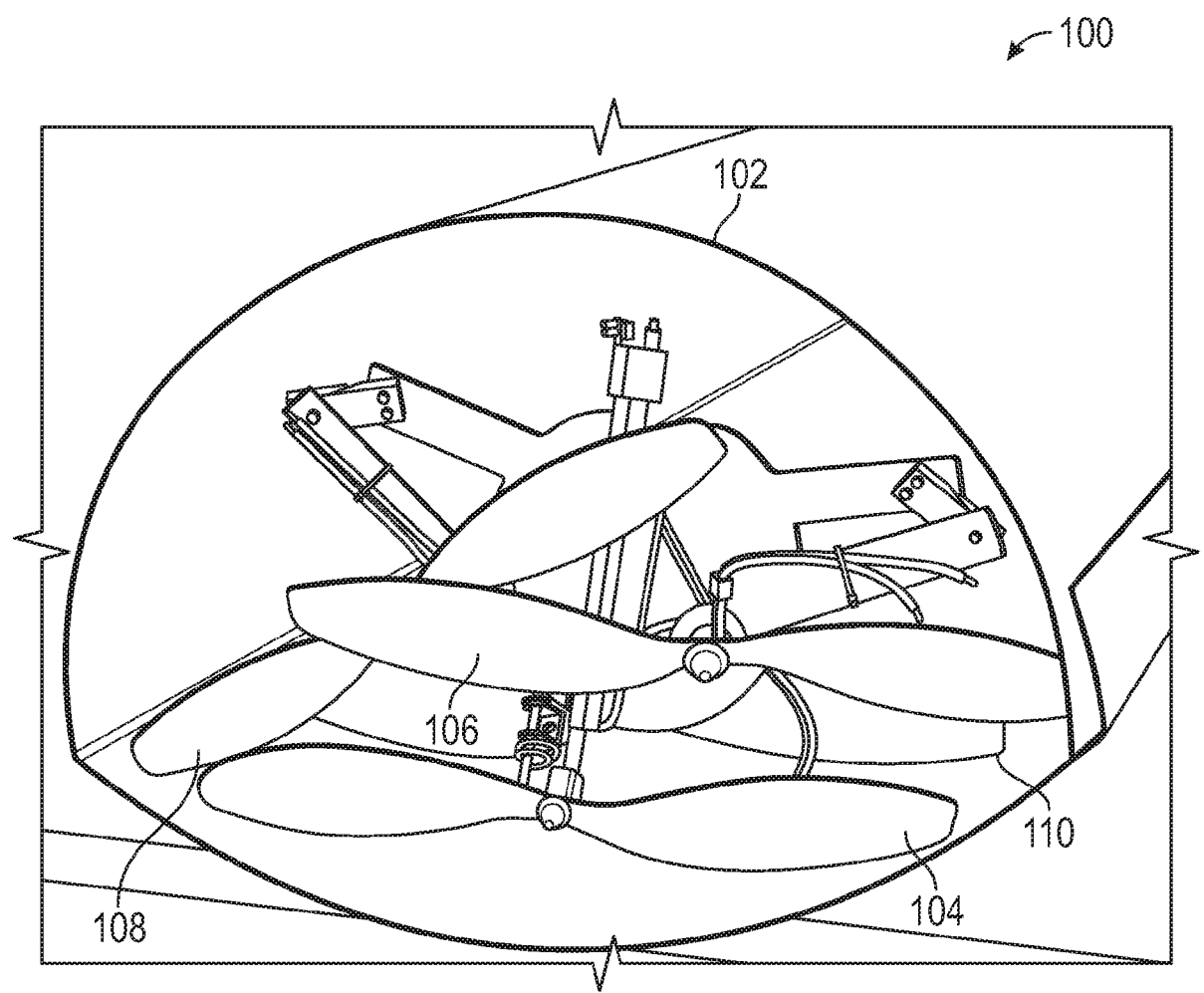
FIG. 1 shows a folded configuration of multiple arms.

It should be understood that the appended drawings are not necessarily to scale, presenting a somewhat simplified representation of various features illustrative of the basic principles of the disclosure. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE DISCLOSURE

The following examples illustrate properties and advantages of some of the embodiments of the present disclosure. Furthermore, these are examples of reduction to practice of the present embodiments and confirmation that the principles described in the present disclosure are therefore valid but should not be construed as in any way limiting the scope of the disclosure.

Although the following detailed description contains many specifics for the purposes of illustration, anyone of ordinary skill in the art will appreciate that many variations and alterations to the following details are within the scope of the disclosure. Accordingly, the following embodiments are set forth without any loss of generality to, and without imposing limitations upon, the claims.

In this detailed description, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present disclosure.

Furthermore, in this detailed description, a person skilled in the art should note that quantitative qualifying terms such as "generally," "substantially," "mostly," "approximately" and other terms are used, in general, to mean that the referred to object, characteristic, or quality constitutes a majority of the subject of the reference.

Unmanned vehicles can be used to perform surveillance, reconnaissance, and exploration tasks for military and civilian applications. Unmanned vehicles may be outfitted with a functional payload, such as sensors for collecting data from the surrounding environment. The sensors may be used to sense acceleration, pitch, yaw, roll, temperature, depth, altitude, attitude, barometric pressure, orientation or other desired parameter. The sensors may be adapted to sense one or more ambient conditions or one or more apparatus conditions. Furthermore, remote-controlled unmanned aerial vehicles, which include fixed-wing aircraft and rotary-wing aircraft, can be used to provide aerial imagery of otherwise inaccessible environments.

The disclosure applies to any expandable/ retractable arm assembly. For description purposes, the principles articulated herein are described in relation to a multi-rotor vehicle having expandable/retractable arms. The vehicle may be an aerial vehicle, such as an unmanned aerial vehicle (UAV), a drone, a manned aerial vehicle, a space exploration vehicle, an underwater vehicle, a sub-marine type vehicle, a bathysphere, a naval surface vehicle, or other type of land, air, sea or outer-space vehicle. Embodiments described herein also apply to structures, such as outdoor equipment used for camping or any suitable support structure.

In one embodiment, an expanding multi-arm vehicle or structure allows the multi-arm vehicle or structure to be stored in a highly compact configuration, then expand autonomously or semi-autonomously for deployment, which may include aerial deployment (flight), outer-space deployment, such as a lunar landing module, or space exploration vehicle, underwater deployment (propulsion of an underwater, or water surface vehicle) or structural deployment (supporting a structural load). The expansion and/or extension of arms and/or expansion and/or extensions of other components permit utilization of the embodiments described herein for any suitable environment or circumstance.

An embodiment, as described herein, allows devices, vehicles or structures having a plurality of extendable components to be compactly transported over long ranges at high speed, then deployed, from the compact state and expanding to the expanded state, automatically. This is illustrated herein by describing multi-rotor unmanned aerial vehicle (MR UAV) embodiments. However, any object with expanding and/or extending components and retracting the components are within the ambit of the present disclosure.

Referring back to an MR UAV embodiment, once in the expanded, operational configuration, the multi-arms, typically each arm having an associated rotor, or rotor blades, may also be contracted for further storage and/or transportation.

Specifically, a multi rotor drone has three or more arms that extend beyond the main fuselage containing the propellers and motors for flight. These extended arms create a large or larger footprint for the multi rotor, complicating storage and transportation by taking up more volume when in a deployed or operational configuration.

Embodiments described herein allow these arms to be extended and retracted in a space-efficient manner. Embodiments include a UAV having one or more arms that rotate about a tilted axis that allows them to rotate "out of plane". One or more arms of the UAV extend prismatically, and one or more arms of the UAV rotate about the horizontal axis for storage underneath the fuselage. This combination of articulations allows the typically cumbersome propeller/motor components to be stacked in an efficient manner.

Once the arms are in an extended configuration, it is an embodiment of the disclosure that the arms may be replaced in a contracted (folded) configuration by folding the arms into the contracted position.

The embodiments allow various types of multi rotor (MR) Unmanned Aerial Vehicles (UAVs) or drones to be easily transported in a compact configuration, then expanded for use. This has several practical advantages, such as improving the ability to transport the UAVs over long ranges at high speeds, then deploy the UAVs automatically, thus vastly increasing useable range. This compact capability also allows multiple MRs to be carried together in a small form factor. This technique is also used to retract the MR for further compact transport or storage after use.

As described herein, the embodiments allow MRs to be transported over long distances by larger aircraft much more efficiently, thus, vastly improving their operational reach. Further, MRs, with their extended arms, which may include rotors, occupy a much larger "footprint" than the sum volume of their individual parts since the MRs are not very dense. Embodiments described herein allow MRs to be reconfigured to occupy much less volume, which is advantageous during storage and transport.

The techniques described herein may be applied in any scenario where MR UAVs need to be stored or transported in space-limited locations. This includes any scenario in which MR UAV performance would be enhanced by having a longer range or reach. Both commercial and military scenarios would be improved. These include, by way of example: 1) commercial surveillance in which the survey area of interest is at a distance greater than the MR's inherent range; 2) military surveillance in which the target area of interest is at a distance greater than the MR's inherent range; and 3) military applications in which multiple MR UAVs are carried, or transported, by a space-limited "mother ship" aircraft over a large distance, then deployed over a mission area.

The disclosed embodiments include features that allows MR UAVs to be folded in a way that is highly space efficient (FIG. 1), and that can expand automatically with no input from a human operator.

FIG. 1 shows an overview 100 of a casing, or container, 102, holding a contracted MR UAV having rotor blades 104, 106, 108 and 110. Each rotor blade 104, 106, 108 and 110 is typically attached to an associated arm (while not all the arms are completely visible in FIG. 1, the folded configuration is illustrated).

One embodiment, disclosed herein, is directed to a four-rotor UAV with 14 inch propellers that can be folded into a space no larger than an 18 inches by 9 inches semi-circle, yet, when expanded, it has a "wing span" of 22 inches from rotor-center to rotor-center, or 36 inches from rotor prop tip-to-tip. Thus, the compact configuration occupies approximately 130 square inch (in$^2$) footprint, while the expanded configuration occupies approximately 1,000 square inch (in$^2$) footprint, a space savings of over eight times (8x). In other embodiments the space savings may be at least 4 times (4x) that of an expanded or operationally configured apparatus/UAV. The advantages are: 1) The autonomous or semi-autonomous expansion allows the MR, or a group of MRs to be operated remotely over much larger range; 2) MRs can be stored in a more space-efficient way, improving the density of storage/transport, allowing the UAVs to be transported by smaller carriers, or to deploy more UAVs in a given scenario; and 3) The combination of joints allows a highly compact and space-efficient storage configuration to be achieved.

Utilization of embodiments described herein permits use MR UAVs at greater range. The MRs may be easily delivered to a far-away mission space.

This disclosure describes an apparatus that uses either one, two, or three different methods, which results in a highly space efficient design. The use of a single method is one embodiment, the use of two methods is another embodiment and the use of three methods is yet another embodiment. These methods include a first method of using an actuator, such as a prismatic joint, for expanding one or more arms (such as MR arms). A second method includes using elbow rotations about an axis. The rotation may be any suitable angle, and one embodiment is a rotation of approximately 20 degrees relative to a perpendicular to a plane, such as the rotor plane, for one or more of the arms, such as MR arms. A third method includes using a shoulder rotation about an axis that is within the plane for one or more arms.

MR UAVs typically comprise a central, compact fuselage, which contain the control systems, power systems and payload, and four or more arms extending radially outward that hold, or support, the motors and rotor blades that propel the UAV (rotor arms). The arms extend automatically using three different methods (actuator, shoulder rotation and elbow rotations) for extension which results in a highly space efficient design using less than half the volume of an apparatus deployed for operation.

Figure 2:
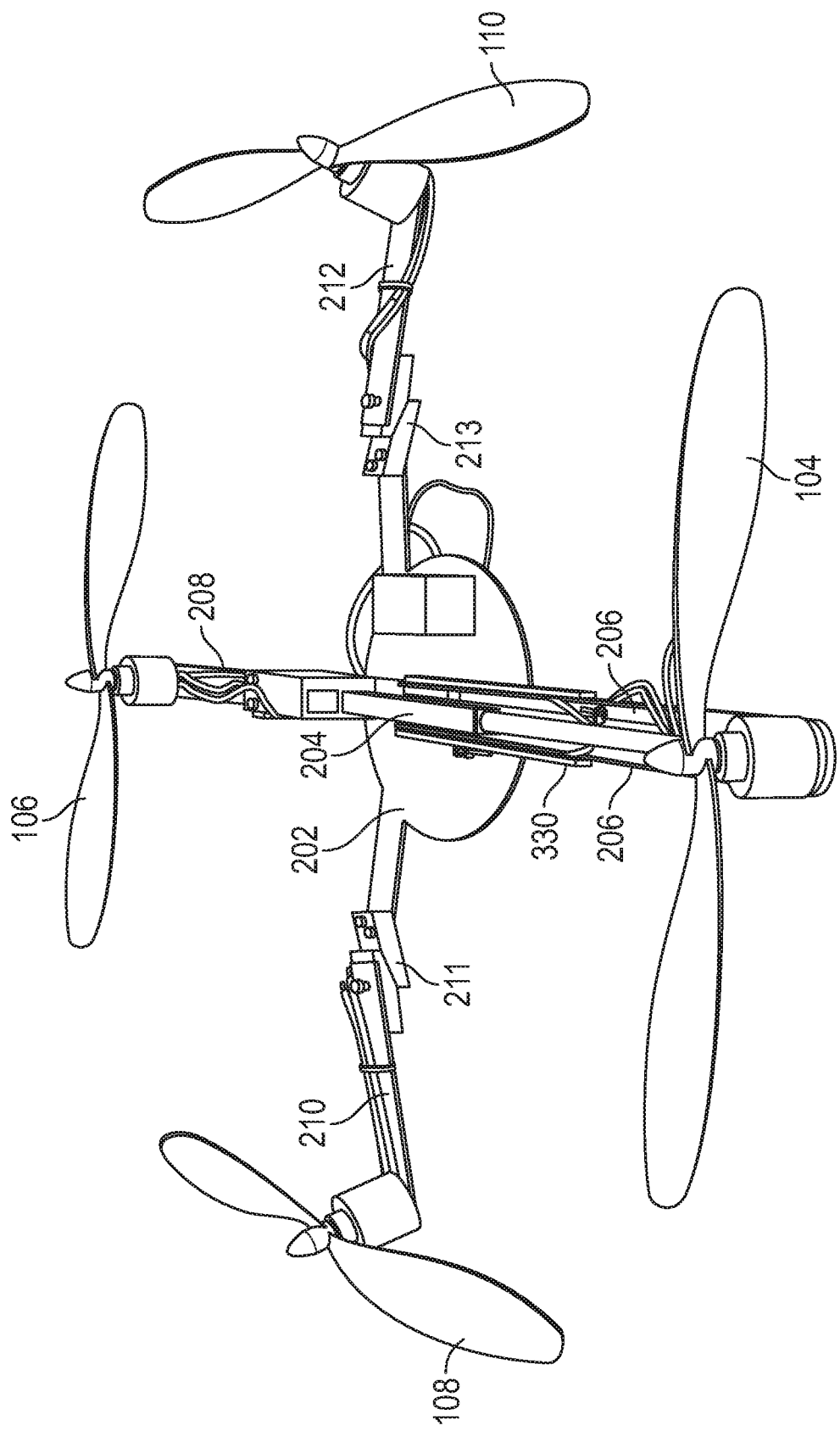
FIG. 2 shows an embodiment of the multi-arms in an open configuration.

FIG. 2 shows an embodiment of the multi-arms in an open configuration. While the arms are identified by a particular number, use of this nomenclature is not meant to imply that these particular articulations are limited to the arms shown, or that the disclosure should be limited in this way.

FIG. 2 shows a support member, or support structure 202 that is used to provide a structure for arms 206, 208, 210 and 212 and a fuselage (not shown). Each arm 206, 208, 210 and 212 has associated rotor blades 104, 106, 108 and 110, respectively. Also shown are actuator 204 and hinges 211 and 213, which are part of arms 210 and 212, respectively. Guide rail 330 is also shown.

While four arms 206, 208, 210 and 212 are shown, additional arms are also within the scope of this disclosure and claims. Indeed, the number of arms is a design choice and there can be any number of arms that are able to fit on the apparatus. The support 202 may be modified to facilitate additional arms.

Support member, or support structure, 202 is suitably any frame or structure or skeleton that provides a support for the arms. The support 202 may be a fuselage, tent apparatus, sports equipment, underwater device, space device or other frame apparatus that supports arms.

One embodiment described herein comprises a prismatic joint (not shown in FIG. 1) on an arm 206 that extends axially. The arm 206 is affixed to a linear guide (shown in FIG. 6) to constrain the axial motion and the motion is actuated by an actuator, which may be a ball-screw linear actuator or any type of linear actuator, such as a solenoid, shape memory allow wire, pneumatic or hydraulic ram, or other actuator that performs the function of extending the arm 206 axially. The linear guide may also be referred to as a linear guide rail or linear guide member. The actuator provides the motion to actuate the other arms, which in FIG. 2 are shown as three remaining expanding arm joints for arms 208, 210 and 212.

Arm 208 is moved by actuation of a linkage, which may be a grooved member, which includes a pulley, and line, or other suitable associated linkage, for movement, which may be shoulder rotation about an axis that is within a plane parallel to the rotor plane for arm 208. The movement of arm 208 is initiated by the axial extension of arm 206.

Arms 210 and 212 include two or more rotating "elbow" joints for expanding two or more arms (shown as arm 210 and arm 212 in FIG. 2). The details of these joints are shown in FIG. 4. The axis of rotation is placed approximately midway between the rotor axis and the center of the MR, thus enabling the arm (210, 212) to be folded roughly in half. The axis of rotation is not parallel to the rotor axis of rotation, instead, it is angled approximately 20° off of the rotor axis. Therefore, in the folded position, the distal halves of arms 210 and 212 are held approximately 40° out of the main rotor plane, thus storing them out of the way of the other rotor arms 206 and 208 and fuselage (not shown in FIG. 2). When in the extended or operational position, these halves are aligned within the rotor plane.

Figure 3:
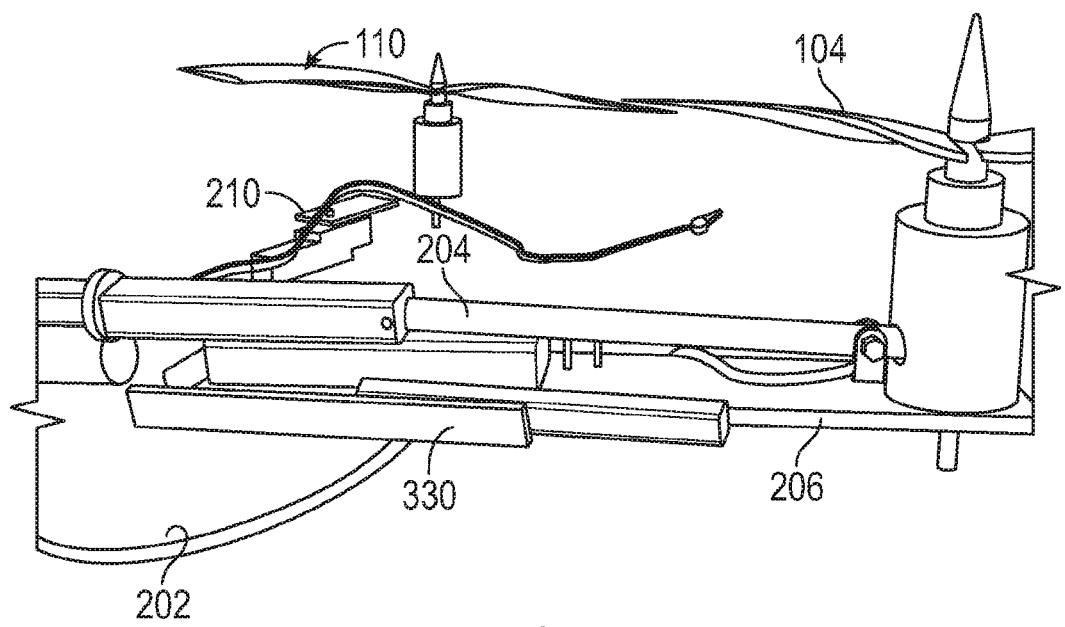
FIG. 3 shows a position of an arm according to an embodiment.

FIG. 3 shows support frame 202, arm 206, actuator 204, and arm 210, linear guide rail 330. Rotor blades 104 of arm 206 and rotor blades 110 of arm 210 are also shown. FIG. 3 shows the actuator 204, in an extended state, which has moved arm 206 to an expanded position.

Figure 4A:
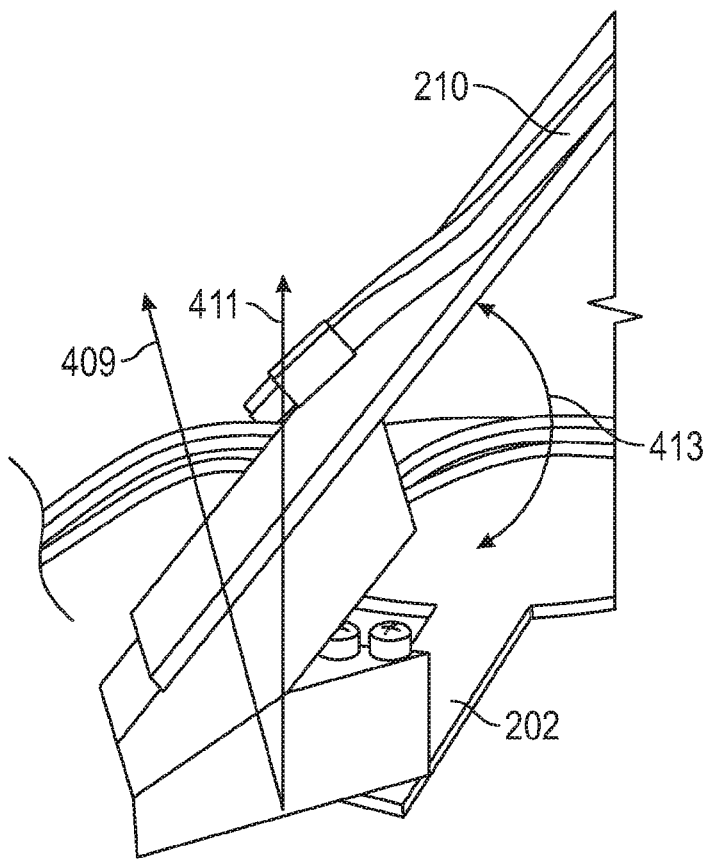
FIGS. 4A and 4B show a joint of an arm according to an embodiment.

FIG. 4A shows an illustration of an arm joint as an elbow joint of arm 210. Arm 210 is illustrated in a substantially folded position. Rotor axis 411, elbow rotation 409 and angle 413 are shown. The elbow rotation 409 is approximately 20° (20 degrees) off rotor axis 411. Angle 413 shows a storage configuration, which is 40° (40 degrees) over the rotor plane.

Figure 4B:
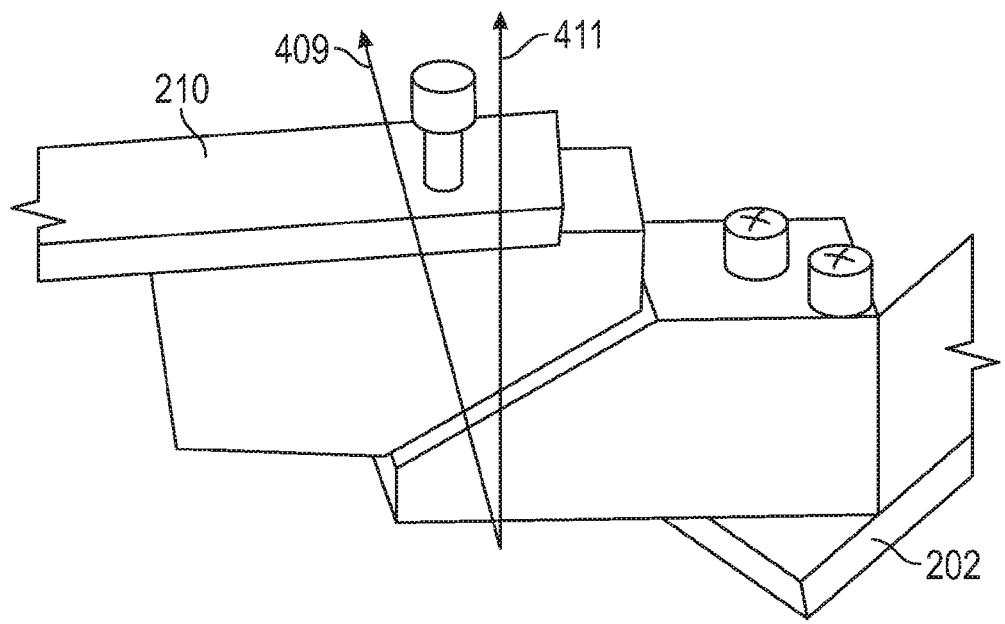

FIG. 4B shows an illustration of an arm joint with the arm 210 in a substantially open or unfolded position relative to FIG. 4A, and rotor axis 411 and elbow rotation 409 are shown.

Figure 5:
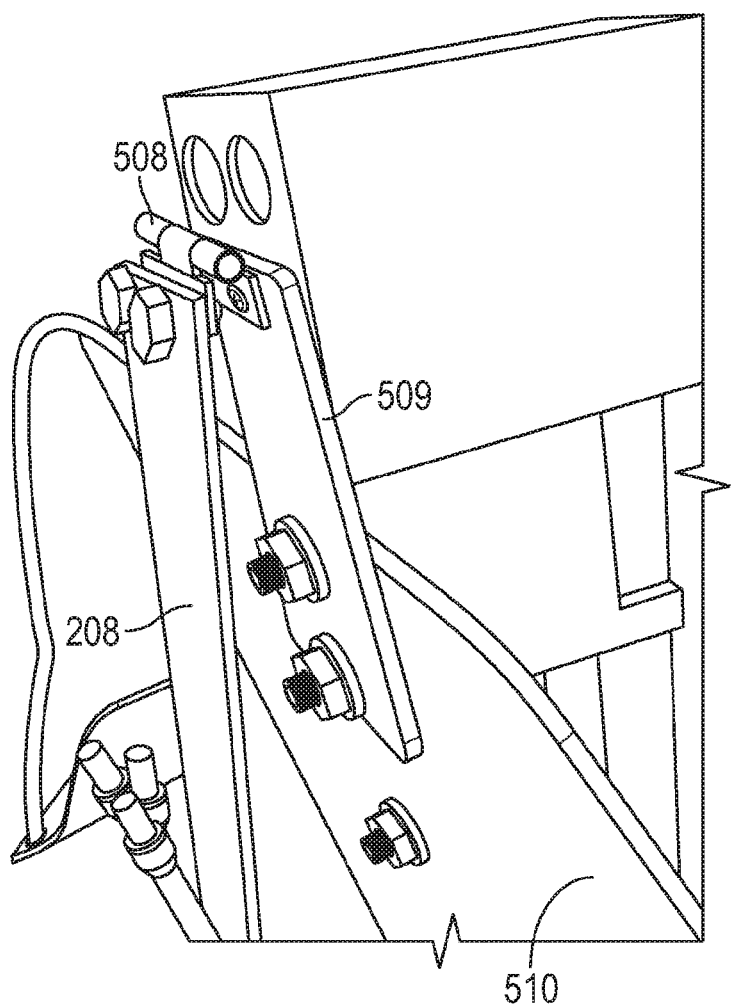
FIG. 5 shows another joint of an arm according to an embodiment.

FIG. 5 shows an illustration of an arm joint as a shoulder joint, which, as illustrated allows arm 208 to rotate about the horizontal axis using a hinge 508 that is fixed to an extension 509 of the baseplate 510. This shoulder joint allows the arm to be extended straight out or fully collapsed underneath the MR fuselage (not shown in FIG. 5).

Additionally, it is an embodiment to actuate all of the arm joints for the arms (206, 208, 210 and 212, as shown in the various figures herein) during unfolding. While four arms are described, it is an embodiment that any suitable number of arms could be used.

Indeed, additional arms to the four arms shown herein, may use any of the techniques or joints (actuator, shoulder and/or hinge) described herein to move from a contracted (folded) position to a non-contracted (un-folded) position. The use of any suitable number of arms may be achieved. In one embodiment, a single actuator provides all of the required triggers to unfold all of the arms.

Figure 6:
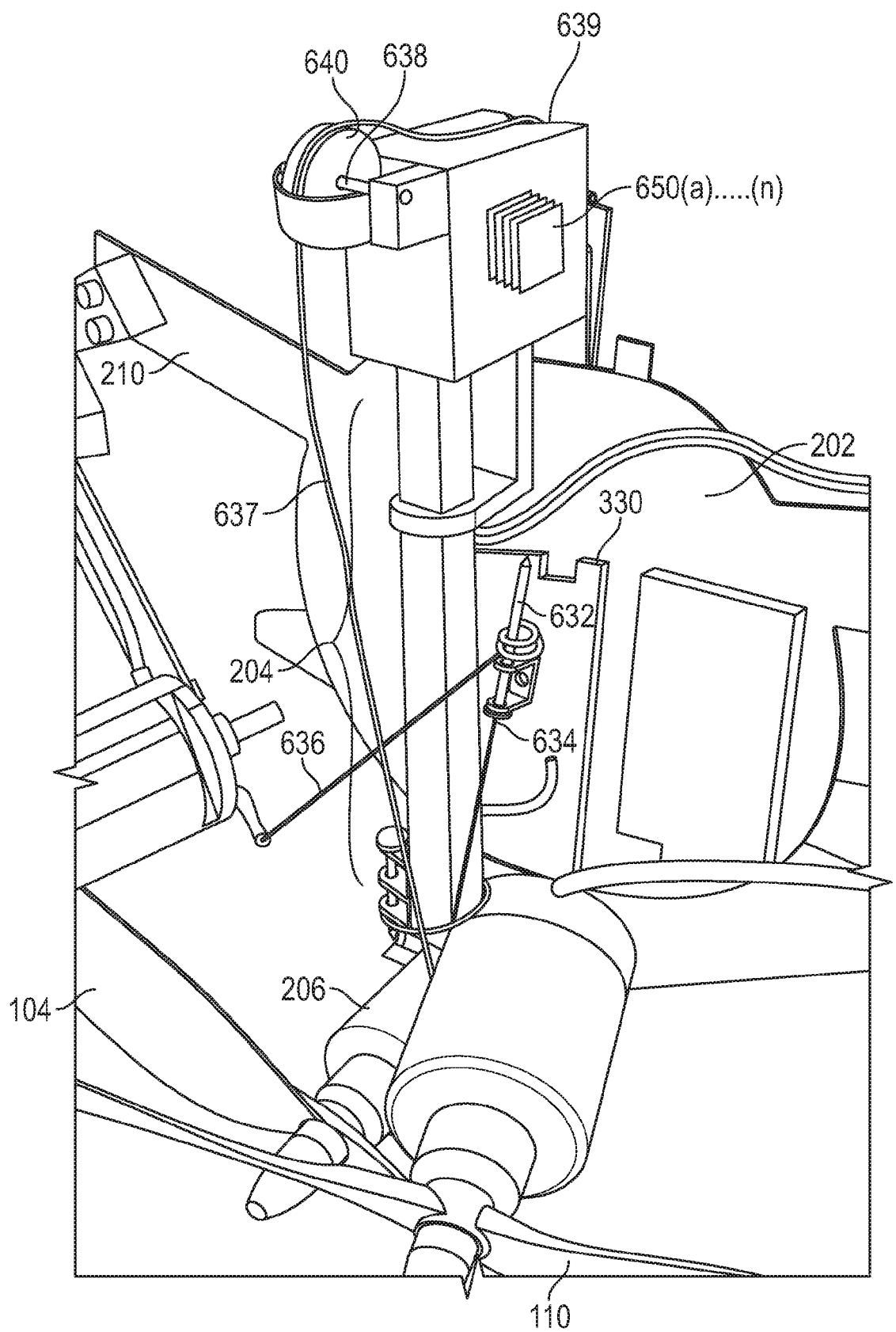
FIG. 6 shows an embodiment of the arm actuation system.

FIG. 6 shows that an actuator 204, shown as a prismatic actuator, which is disposed on arm 206 and connected to the linear guide rail 330, extends arm 206. An arm (shown as arm 208 herein), which may be the horizontally hinged arm that utilizes shoulder rotation, is connected to actuator 204 by a line 637 and pulley 640, which is attached to pulley axle 638. The line 637 and pulley 640 operate in conjunction to release an arm (not shown in FIG. 6 but shown as arm 208 herein) from the contracted position (folded) to the non-contracted position (unfolded). Sensor(s) 650(a)... (n), where "n" is any number, are shown as mounted on the support frame 202. The sensors (generally 650) are any suitable sensor for sensing desired atmospheric, environmental and/or apparatus conditions. These parameters include acceleration, pitch, yaw, roll, temperature, depth, altitude, attitude, barometric pressure, orientation or other desired parameter. The one or more sensors (generally 650) may also sense the relative position of one or more arms. The sensor 650 may sense when the arm(s) are fully deployed, partially deployed, or other operational status, an altitude of the apparatus, and attitude of the apparatus or other condition or parameter of the apparatus. The sensors may also transmit the sensed data to a remote location that collects and analyzes the sensed data collected by sensor 650. The sensors, generally 650 may include transmitter(s) to transmit the sensed data to a processing module, or intermediate transmission location for further signal propagation.

As the actuator 204 extends linearly, line 637 is pulled, providing tension to rotate arm (shown as arm 208 herein) into position. Other arms (shown as arms 210 and 212 herein) are spring-loaded and held in the retracted position by associated linkages, shown as tethers, 634, 636, respectively, that are held by the actuator 204, shown as a prismatic actuator, of arm 206 with pin 632.

As the actuator 204 extends, pin 632 is displaced and linkages, which are shown as tethers, 634 and 636 are released. At this point, arms 210 and 212 (arm 212 not shown in FIG. 6) swing down gently into place and are locked in the extended position by a pin (not shown) through the complementary inclined planes. The pins and/or rings, used alone or in combination, are a securing mechanism. Any technique that releasably holds the arms in a folded position until released is a securing and/or locking and/or position locking mechanism. The securing and/or locking mechanism may comprise magnets, detents, pins, spring-loaded latch, or other suitable securing and/or locking apparatus.

FIG. 6 shows an example of the linkage being tethers 634 and 636 as well as line 637. The connective fibers of tethers 634, 636 and line 637 may be any suitable material that provides the strength and control features of the tethers and line elements described herein. Materials such as string, thread, rope as well as rigid linkages are embodiments of this disclosure. The use of a rigid linkage enhances a folding process to place the arms in the contracted position.

While two tethers 634 and 636 are shown in FIG. 6, it is an embodiment that any suitable number of additional arms could be used. One way to achieve use of additional arms is the addition of arms similar to arms 210 and 212 with associated tethers with rings to be inserted over pin 632.

The embodiment described in FIG. 2, may be optimized for size, weight, and power and to enhance reliability. As shown in FIG. 2, automatic expansion of all four rotor arms under the motion of the prismatic actuator is accomplished. While a ball-screw prismatic actuator is suitable, a pneumatic actuator may also be used for speed, power and reliability considerations. Indeed, the linear guide 330 on arm (shown herein as element 206) may be replaced by a custom prismatic joint, appropriate for the specific UAV.

Furthermore, the remaining joints may also be optimized for performance and compactness. To refold the arms following expansion, rigid linkages may be used in place of the line and pulley 638, 640.

There are numerous alternative embodiments, some of which are described herein by sub-system:

Axial Displacement System: As shown herein at least one arm (shown as arm 206 herein) uses a slide as a linear guide with a prismatic ball-screw actuator, but other linear guides and other prismatic actuators could be used. The prismatic actuator could be any type of linear actuator, such as a solenoid, shape memory allow wire, pneumatic or hydraulic ram, ultrasonic piezoelectric motor, etc. The linear guide could be a tongue-in-groove, a shaft-in-sleeve, or double shaft-in-sleeve. Indeed, linear guide could be embodied by a custom prismatic joint, appropriate for the UAV.

Line and Pulley System: The embodiment shown herein uses fishing line, but rigid linkages could also be used, which would allow folding and unfolding. In addition, toothed or un-toothed belts may be used instead of a line.

Arm Lock System: The arms (shown herein as arms 208, 210 and 212) as shown herein, are shown as held in place after extension by vertical pins. There are numerous possible alternative embodiments for locking and releasing the arms. These alternate embodiments could comprise sliding couplers, horizontal pins, magnets, detents, spring-loaded latch (of any suitable designs), solenoid-activated latch or locking pawl, shape memory allow activated latch or locking pawl or any interchangeable technique and/or apparatus.

The embodiments described herein may be used in any field or endeavor in which arm-like structures may be expanded and/or retracted to improve space and storage efficiency. Any number of space-based structures, such as satellites and space stations, terrestrial antennae, sports equipment, or camping equipment, underwater environments, aerial environments and other suitable environments.

Various embodiments are described herein and include apparatus and methods.

One method ("the method") comprising: actuating a first arm of an apparatus to extend from a contracted position to a non-contracted position; actuating a second arm of the apparatus to move, in response to the extension of the first arm, from a contracted position to a non-contracted position; and releasing a first linkage attached to a spring-loaded third arm of the apparatus, in response to the extension of the first arm, causing the third arm to move from a contracted position to a non-contracted position.

Another method includes the method as described above and further comprising: releasing a second linkage attached to a spring-loaded fourth arm of the apparatus, in response to the extension of the first arm, causing the fourth arm to move from a contracted position to a non-contracted position.

Another embodiment includes the method as described above, further comprising: maintaining one or more arms in the non-contracted position of the arm.

Another embodiment includes the method as described above, further comprising: guiding the first arm when the first arm extends from the contracted position to the non-contracted position.

Another embodiment includes the method as described above, further comprising: guiding the first rotor arm along an approximately linear path.

Another embodiment includes the method as described above, further comprising: providing tension to the second arm during movement from the contracted position to the non-contracted position.

Another embodiment includes the method as described above, further comprising: providing tension on the second arm to move the second rotor arm in an approximately predetermined path.

Another embodiment includes the method as described above, further comprising: releasing the first linkage attached to the spring-loaded third arm by dis-engaging a portion of the first linkage from an attachment member.

It is also within the scope of this disclosure that each of the arms could be actuated, or unfolded, utilizing an actuator, which may be associated with each arm. Thus, the embodiment would utilize actuators to unfold each arm, rather than linkages.

Another embodiment includes the method as described above, where the attachment member is disposed on the actuator.

Another embodiment includes the method as described above, further comprising: sensing one or more conditions.

Another embodiment includes the method as described above, where the third arm moves from the contracted position to the non-contracted position, the non-contracted position being in a plane that is different than a plane of the contracted position.

Another embodiment includes the method as described above, further comprising: releasing additional and/or associated linkages, which may be tethers (releasing additional tethers), attached to associated arms of the apparatus, causing the additional arms to move from a contracted position to a non-contracted position.

Another embodiment is directed to an apparatus comprising:
 a support member;
 an actuator, mounted on a portion of the support member;
 a first arm coupled to the support member at a first portion of the first rotor arm, and having a rotor disposed at a second portion of the first rotor arm, the first rotor arm operatively coupled to the actuator, and adapted to extend from a first position to a second position upon actuation of the actuator;
 a second rotor arm coupled to the support member at a first portion of the second rotor arm, and having a rotor disposed at a second portion of the second rotor arm, the second rotor arm operatively coupled to the actuator and adapted to move from a first position to a second position upon actuation of a linkage;
 a third arm coupled to the support member at a first portion of the third arm, the third arm adapted to move from a first position to a second position upon release of a tether attached to the third arm; and
 a fourth arm coupled to the support member at a first portion of the fourth arm, the fourth arm adapted to move from a first position to a second position upon release of a tether attached to the fourth arm.

Another embodiment is directed to a method of retraction comprising:
 moving a first arm from an extended position to a contracted position by folding a hinge on the arm;
 moving a second arm from an extended position to a contracted position by folding a rotating connection; and
 moving a third arm from an extended position to a contracted position by axially compressing a distal portion of the third arm.

While the present disclosure has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The disclosure in its broader aspects is therefore not limited to the specific details, representative apparatus and method, and illustrative examples shown and described. Accordingly, departures may be made from such details without departing from the scope of the general inventive concept.

Some of the illustrative aspects of the present disclosure may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the disclosure has been described with reference to exemplary embodiments, it will be understood by those skilled in the art that various changes may be made and equivalents may be substituted for elements thereof without departing from the scope. In addition, many modifications may be made to adapt a particular situation or material to the teachings without departing from the essential scope thereof.

Therefore, it is intended that the disclosure not be limited to the particular embodiment disclosed as the best or only mode contemplated for carrying out this disclosure, but that the disclosure will include all embodiments falling within the scope of the appended claims. Also, in the drawings and the description, there have been disclosed exemplary embodiments and, although specific terms may have been employed, they are unless otherwise stated used in a generic and descriptive sense only and not for purposes of limitation, the scope of the disclosure therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the disclosure should be determined by the appended claims and their legal equivalents, and not by the examples given.

What is claimed is:

1. A rotor arm system for an unmanned aerial vehicle having a plurality of rotor arms, the vehicle having a fuselage, the rotor arm further comprising:
 a support member;
 an actuator, mounted on a portion of the support member;
 the rotor arm system having a first rotor arm portion coupled to the support member and the actuator at a first rotor arm portion of the first rotor arm, and a second rotor arm portion attached to the rotor; the first rotor arm portion operatively coupled to the actuator, and adapted to extend the second rotor arm portion from a first position under the fuselage to a second position off a rotor axis and traverses over a rotor plane upon actuation of the actuator such that the second rotor arm portion and the rotor is above and away from the fuselage.

2. The apparatus as claimed in claim 1, where the actuator is a prismatic actuator.

3. The apparatus as claimed in claim 1, where the actuator is a pneumatic actuator.

4. The apparatus as claimed in claim 1, further comprising:
 a linear guide rail attached to the first rotor arm and operatively coupled to the actuator that guides the first rotor arm when the first rotor arm extends from the first position to the second position and;
 a tether attached to the remaining plurality of rotor arms and extends the remaining plurality of rotor arms when the first rotor arm is extended by the actuator.

5. A method for deploying rotor arms of an unmanned vehicle, the vehicle having a fuselage, the method comprising:
 actuating a first rotor arm of an apparatus to provide an extension of the first rotor arm from a contracted position to a non-contracted position out from under the fuselage; and
 a tether actuating a second rotor arm of the apparatus to move the second rotor arm, in response to the extension of the first arm, from the contracted position to the non-contracted position out from under the fuselage; and
 actuating a first linkage attached to a third rotor arm of the apparatus, in response to the extension of the first rotor arm, causing the third rotor arm to move from the contracted position to the non-contracted position out from under the fuselage, actuating a second linkage attached to a fourth rotor arm, in response to the extension of the first rotor arm, causing the fourth rotor arm to move from the contracted position to the non-contracted position out from under the fuselage.

\* \* \* \* \*